(12) United States Patent
Park

(10) Patent No.: US 12,412,197 B2
(45) Date of Patent: Sep. 9, 2025

(54) NON-FACE-TO-FACE CONSULTING SYSTEM FOR SKIN CARE AND COSMETICS USE

(71) Applicant: INCODONBIOCOSMETIC CO., LTD., Gwangyang-si (KR)

(72) Inventor: Jeung Hye Park, Naju-si (KR)

(73) Assignee: INCODONBIOCOSMETIC CO., LTD., Gwangyang-si (KR)

( * ) Notice: Subject to any disclaimer, the term of this patent is extended or adjusted under 35 U.S.C. 154(b) by 622 days.

(21) Appl. No.: 17/851,070

(22) Filed: Jun. 28, 2022

(65) Prior Publication Data

US 2023/0419370 A1 Dec. 28, 2023

Related U.S. Application Data

(63) Continuation of application No. PCT/KR2022/008977, filed on Jun. 23, 2022.

(51) Int. Cl.
| | |
|---|---|
| *G06F 17/00* | (2019.01) |
| *G06Q 30/02* | (2023.01) |
| *G06Q 30/0601* | (2023.01) |
| *G06T 7/00* | (2017.01) |
| *G06T 7/55* | (2017.01) |
| *G06T 7/90* | (2017.01) |

(52) U.S. Cl.
CPC ..... *G06Q 30/0281* (2013.01); *G06Q 30/0631* (2013.01); *G06T 7/0016* (2013.01); *G06T 7/55* (2017.01); *G06T 7/90* (2017.01); *G06T 2207/10024* (2013.01); *G06T 2207/10152* (2013.01); *G06T 2207/30088* (2013.01)

(58) Field of Classification Search
CPC .. G06Q 30/0281; G06Q 30/0631; G06T 7/55; G06T 7/90; G06T 7/0016; G06T 2207/10024
See application file for complete search history.

(56) References Cited

U.S. PATENT DOCUMENTS

| | | | | |
|---|---|---|---|---|
| 8,290,257 B2* | 10/2012 | Demirli | ............... | A61B 5/442 |
| | | | | 382/128 |
| 8,673,372 B2* | 3/2014 | Swanson | ............... | A61Q 19/02 |
| | | | | 424/401 |
| 9,345,429 B2* | 5/2016 | Suzuki | ............... | G06T 5/77 |
| 10,219,736 B2* | 3/2019 | Davis | ............... | A61B 5/6898 |
| 10,304,202 B2* | 5/2019 | Han | ............... | G06T 7/0016 |
| 10,789,681 B2* | 9/2020 | Kriener | ............... | H04N 23/635 |

(Continued)

FOREIGN PATENT DOCUMENTS

| | | |
|---|---|---|
| KR | 10-2012-0092889 A | 8/2012 |
| KR | 10-2018-0064963 A | 6/2018 |

*Primary Examiner* — Mohammed H Zuberi
(74) *Attorney, Agent, or Firm* — Revolution IP, PLLC

(57) ABSTRACT

According to an exemplary embodiment of the present invention, a non-face-to-face consulting system for skin care and cosmetics use is provided that includes: a non-face-to-face consulting server providing a user with consultations on skin care method and recommended cosmetics based on skin conditions of an analyzed user by analyzing the skin conditions of the user when the skin condition information of the user is received; and a skin care application (App) disposed on a user terminal and transmitting the skin care information including a skin photograph of the user and a skin condition reply of the user to the non-face-to-face consulting server.

3 Claims, 2 Drawing Sheets

(56) References Cited

U.S. PATENT DOCUMENTS

| | | | |
|---|---|---|---|
| 11,484,247 B2* | 11/2022 | Dascalu | A61B 5/444 |
| 11,585,654 B2* | 2/2023 | Hosseinimakarem | G01B 11/303 |
| 2006/0269111 A1* | 11/2006 | Stoecker | G16H 30/40 382/128 |
| 2015/0213619 A1* | 7/2015 | Nakamura | G06T 5/70 382/128 |
| 2018/0150896 A1* | 5/2018 | Parkkinen | G06Q 30/0271 |
| 2019/0206033 A1* | 7/2019 | Wu | G06V 40/161 |
| 2021/0027897 A1* | 1/2021 | Rasochova | A61B 5/0077 |
| 2021/0307498 A1* | 10/2021 | Tarling | A46B 15/0002 |
| 2022/0051409 A1* | 2/2022 | Maclellan | A61B 5/444 |
| 2022/0101405 A1* | 3/2022 | Kulovesi | G06V 40/168 |
| 2022/0198830 A1* | 6/2022 | Li | G06V 40/178 |
| 2024/0177213 A1* | 5/2024 | Yoon | G06Q 30/0621 |

* cited by examiner

[FIG. 1]
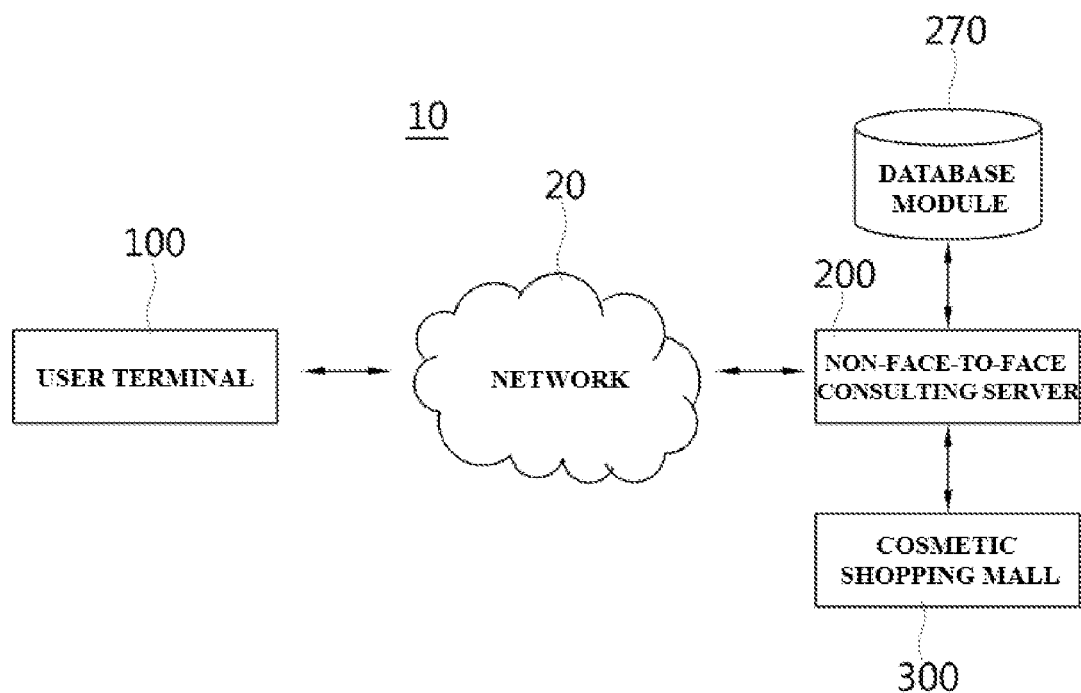

[FIG. 2]
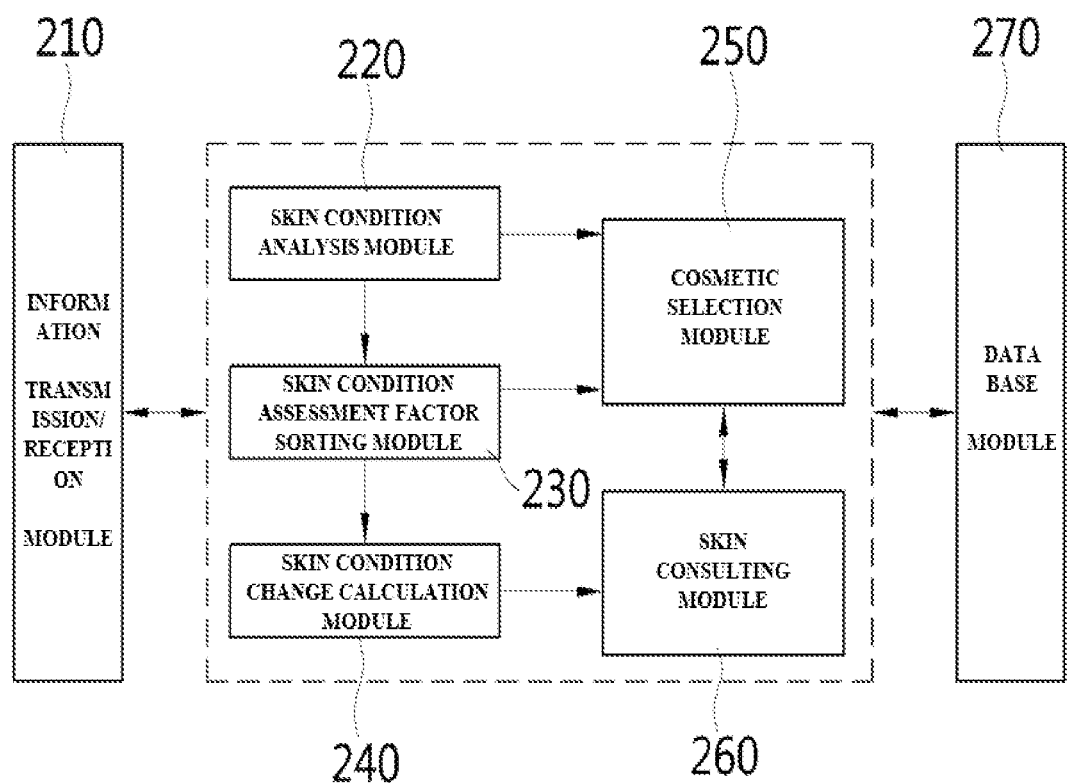

NON-FACE-TO-FACE CONSULTING SYSTEM FOR SKIN CARE AND COSMETICS USE

TECHNICAL FIELD

The present invention relates to a non-face-to-face consulting system for skin care and cosmetics use.

BACKGROUND OF THE INVENTION

Skin conditions vary from person to person. Skin conditions may be mutually different depending on what types of foods persons take, what types of behaviors the persons take and under what types of environments the persons are exposed to even though they have the same types of skins.

Furthermore, skin conditions change endlessly. An individual must seek personally-fitted cosmetics one by one, and when the individual cannot find personally-matched cosmetics, occasions frequently occur where cosmetics that are not fitted or matched to her or his skin conditions are used.

Meanwhile, current trends are that customized cosmetics markets increase catering to individual skin characteristics. Furthermore, skin diagnosis program developments increase in order to understand individual skin characteristics. Prior arts related thereto may include the Korean Patent Disclosures No. 10-2012-0092889 and No. 10-2018-0064963. It is therefore expected that customized skin care services catering to individual characteristics are required and non-face-to-face skin care program preference increase while trends rise to the level of non-face-to-face era.

DETAILED DESCRIPTION OF THE INVENTION

Technical Subject

The present invention is purported to provide a non-face-to-face consulting system for skin care and cosmetics use that provides consultations with regard to convenient and effective skin care and cosmetics uses catering to individual characteristics by objectively evaluating changes in skin conditions over time depending on types of used cosmetics,

Technical Solution

In one general aspect of the present invention, there may be provided a non-face-to-face consulting system for skin care and cosmetics use, the system comprising: a non-face-to-face consulting server providing a user with consultations on skin care method and recommended cosmetics based on skin conditions of an analyzed user by analyzing the skin conditions of the user when the skin condition information of the user is received; and a skin care application (App) disposed on a user terminal and transmitting the skin care information including a skin photograph of the user and a skin condition reply of the user to the non-face-to-face consulting server.

Effects of the Invention

Embodiments of the present invention have advantageous effects of providing consultations with regard to convenient and effective skin care and cosmetics uses catering to individual characteristics by objectively evaluating changes in skin conditions over time depending on types of used cosmetics.

BRIEF DESCRIPTION OF DRAWINGS

FIG. 1 is a schematic view illustrating a non-face-to-face consulting system for skin care and cosmetics use according to the present invention.

FIG. 2 is a schematic view illustrating a configuration of a non-face-to-face consulting server.

DETAILED DESCRIPTION OF THE INVENTION

The present invention may be embodied in many different modifications and alterations and have several exemplary embodiments, where specific exemplary embodiments will be exemplified through drawings which are to be described in details in the detailed descriptions. However, it should be appreciated that the present invention is not intended to be limited to particular exemplary embodiments but to encompass all equivalent alterations and/or modifications within the scope and spirit of the present invention.

In describing the present invention, detailed descriptions of constructions or processes known in the art may be omitted to avoid obscuring appreciation of the invention with unnecessary detail regarding such known constructions and functions.

Furthermore, the suffixes 'module', 'unit' and 'part' may be used for elements in order to facilitate the disclosure. The terms "unit", "part" and "module" described in the specification mean units for processing at least one function and operation and can be implemented by hardware components or software components, and combinations thereof.

Now, the exemplary embodiments of the present invention will be described in detail with reference to the accompanying drawings.

FIG. 1 is a schematic view illustrating a non-face-to-face consulting system for skin care and cosmetics use according to the present invention and FIG. 2 is a schematic view illustrating a configuration of a non-face-to-face consulting server.

Referring to FIG. 1, a non-face-to-face consulting system (10) for skin care and cosmetics use according to the present invention may include at least one user terminal (100), a non-face-to-face consulting server (200), a database module (270) and a cosmetic shopping mall (300). Here, the non-face-to-face consulting server (200) according to an exemplary embodiment of the present invention, as exemplified in FIG. 2, may include an information transmission/reception module (210), a skin condition analysis module (220), a skin condition assessment factor sorting module (230), a skin condition change calculation module (240), a cosmetic selection module (250), a skin consulting module (260) and a database module (270). Here, the information transmission/reception module (210) may act to perform the role of transmitting information or data to the user terminal (100) and/or receiving the information or data from the user terminal (100) through wired/wireless communications. Furthermore, the database module (270) may store the skin condition information provided to a user, a cosmetics list used by the user and the like.

The user terminal (110) may be equivalent to a computing device, may be embodied by a smart phone, a notebook or a computer, but the present invention is not limited thereto and may be also embodied by various devices including a tablet PC and the like. The user terminal (100) may be connected to the non-face-to-face consulting server (200)

through a network (20), and the user terminal (100) may be simultaneously connected to the non-face-to-face consulting server (200).

The user terminal (100) may be disposed with a skin care application (App) according to the present invention. The skin care App may be so disposed as to manage a skin care schedule for a user.

The skin care App may periodically notify the user with arrival of skin care period when the user is provided with the skin care period related to skin care action periodically performed by the user. Meanwhile, when a user purchases cosmetics, the user may record a purchase history on the skin care App. Furthermore, the skin care App may allow the user to input a cosmetics purchase list and to input a cosmetic use result after a predetermined time lapses. The skin care App may be so alarmed as to allow inputting a use result of a relevant cosmetic when the user starts to use a predetermined cosmetics and a predetermined period of time lapses.

Skin condition information of a user may be inputted as a cosmetics use result. The skin condition information of a user may be a skin photograph of a user, for example. For example when a user intends to input a cosmetics use result, that is, the skin condition information of the user, the skin care App may induce a user to take his or her own photograph. At this time, the skin care App may provide a guideline in order to allow a face of a user to be taken as a photograph based on a predetermined standard.

Furthermore, the skin condition information of a user may be inputted as a reply to a question and answer sheet. For example, the skin care App may receive, from a user, a skin type of a user (dry skin type, normal skin type, oily skin type, combination skin type, sensitive skin type), skin condition change indicator, change indicators of problematic skin condition {(the number of) blackheads, (the number of) whiteheads, (the number and size of) pimples, (the number and size of) pustules, (the number and size of) nodules, (the number and size of) pores, (the number and size of) spots and sebum secretion.

The skin care App may receive consultations by allowing a user to input his or her own skin condition information, and to transmit the relevant skin condition information to the non-face-to-face consulting server (200).

The non-face-to-face consulting server (200) may analyze the skin condition of a user when receiving the skin condition information of the user from the user terminal (100) through the network (20). The skin condition of a user may be analyzed based on a skin photograph of a user and/or a skin condition reply of the user. In this case, the non-face-to-face consulting server (200) may recommend or propose, to a user, a skin care method and/or cosmetics proper to a user by selecting the same based on the analyzed skin condition of the user.

The non-face-to-face consulting server (200) may sort out (select) a skin condition assessment factor based on the skin condition analysis result of a user. Here, the skin condition assessment factor may include an entire skin tone, shapes and number of pimples or troubles of skin, color change of the said troubles, inflammatory skin symptoms, the number and sizes of pores, sebum secretion, skin glows, skin wrinkles, and direction and size of skin wrinkles. The non-face-to-face consulting server (200) may sort out the skin condition assessment factor of a user by analyzing the skin photograph of the user and/or condition reply of the user.

The non-face-to-face consulting server (200) may calculate the skin condition change based on periodically-provided skin condition information of the user. For example the non-face-to-face consulting server (200) may calculate the skin condition change of the user by comparing the skin condition assessment factor showing the skin condition of prior period of the user with the skin condition assessment factor showing the skin condition of current period of the user.

In this case, the non-face-to-face consulting server (200) may provide the skin consulting information in response to the skin condition change. For example, the non-face-to-face consulting server (200) may notify, to the user, whether the skin condition has been improved after use of a predetermined cosmetics, whether the skin condition has remained unchanged, or whether the skin condition has deteriorated. In this case, the non-face-to-face consulting server (200) may recommend or propose, to the user, a proper skin care method based on the skin condition change of the user or by selecting proper cosmetics.

Hereinafter, detailed description thereto will be made in the following manner.

The skin care App in the exemplary embodiment of the present invention may transmit, to the non-face-to-face consulting server (200), the skin photograph captured by the user together with the photograph-shooting condition data set. Here, the photograph-shooting condition data set may be a data set on illumination data of relevant shooting space at an acquisition time of relevant skin photograph, brightness data at a relevant shooting means and color temperature data.

In this case, the non-face-to-face consulting server (200) may perform an image preprocess for matching all skin photograph shooting conditions by adjusting the illumination data, brightness data and color temperature data within the shooting condition data set regarding relevant skin photograph using a pre-set standard illumination data, standard brightness data, and standard color temperature data whenever the skin photograph of the user is received from the skin care App.

Furthermore, the non-face-to-face consulting server (200) may obtain an environmental influence data including temperature data, humidity data and UV strength data with reference to the shooting period of relevant skin photograph. At this time, the said image preprocessed skin photograph together with the environmental influence data may be stored in the database. The non-face-to-face consulting server (200) may perform the calculation of skin condition change of user based on the said image preprocessed skin photograph and the environmental influence data.

Furthermore, the non-face-to-face consulting server (200) may build up the temperature data and humidity data as the environmental influence data, each color of the skin condition assessment factors image-identified by the UV strength data within the skin photograph and correlation model assessable of the influence on the shape change through neural network learning of skin photograph samples of multiple users, using a prior-set neural network model.

Furthermore, the non-face-to-face consulting server (200) may obtain, from outside information servers (e.g., National Weather Service and the like), the daily temperature data, daily humidity data and daily UV strength data as the environmental influence data corresponding to a section between a shooting period of prior skin photograph of selected user and a shooting period of current skin photograph of the user by selecting the most recent prior skin photograph of the user having a shooting time difference more than the prior-set comparison period (e.g., two weeks and the like) from the current skin photograph of the user among the skin photographs of the user stored in the database.

At this time, the non-face-to-face consulting server (200) may generate first skin condition analysis information that has extracted colors and shapes of each skin condition assessment factor identified within a relevant image in a state where the current skin photograph is set as a standard image.

Furthermore, the non-face-to-face consulting server (200) may generate second skin condition analysis information that has extracted colors and shapes of each skin condition assessment factor identified within a relevant image in a state where the prior skin photograph is set as a standard image.

Furthermore, the non-face-to-face consulting server (200) may generate third skin condition analysis information that has extracted changes in colors and shapes of each skin condition assessment factor when the environmental influence data during the said periods is applied by sequentially inputting each of the temperature data, humidity data and UV strength data corresponding to the said periods using parameter values of the correlation model in a state where the prior skin photograph is set as a standard image.

In this case, the non-face-to-face consulting server (200) may confirm an improved skin condition assessment factor at a current period, a deteriorated skin condition assessment factor and a changeless skin condition assessment factor when compared with those of the previous ones, by calculating, as a first comparison, a difference between the colors and shapes of skin condition assessment factor included in the first skin condition analysis information and the colors and shapes of skin condition assessment factor included in the second skin condition analysis information.

Furthermore, the non-face-to-face consulting server (200) may confirm an improved skin condition assessment factor, a deteriorated skin condition assessment factor and a changeless skin condition assessment factor when the environmental influence is reflected, by calculating, as a second comparison, a difference between changed colors and shapes of skin condition assessment factor included in the third skin condition analysis information and changes in colors and shapes of skin condition assessment factor included in the second skin condition analysis information.

Furthermore, the non-face-to-face consulting server (200) may confirm an improved skin condition assessment factor, a deteriorated skin condition assessment factor and a changeless skin condition assessment factor by calculating, as a third comparison, a difference between the colors and shapes of skin condition assessment factor included in the first skin condition analysis information and changed colors and shapes of skin condition assessment factor included in the third skin condition analysis information.

Furthermore, the non-face-to-face consulting server (200) may store, in the database, the cosmetics information used by the user, and cosmetics information used in the skin condition improvement for each skin condition assessment factor.

As a result, the non-face-to-face consulting server (200) may determine, as being proper, the cosmetics related to the improvement of relevant skin condition assessment factor among the cosmetics used by a relevant user when the changeless skin condition assessment factor confirmed by the second comparison result corresponds to the skin condition assessment factor improved in the first comparison result, when the deteriorated skin condition assessment factor confirmed as the second comparison result corresponds to the changeless skin condition assessment factor in the first comparison result, or to the improved skin condition assessment factor, or corresponds to the improved skin condition assessment factor confirmed as the third comparison result.

Furthermore, the non-face-to-face consulting server (200) may determine, as being ineffective, the cosmetics related to the improvement of relevant skin condition assessment factor among cosmetics used by the relevant user, when the deteriorated skin condition assessment factor confirmed by the second comparison result corresponds to the deteriorated skin condition assessment factor confirmed by the first comparison result but corresponds to the changeless skin condition assessment factor confirmed by the third comparison result.

Furthermore, the non-face-to-face consulting server (200) may determine as being negligent in management to a relevant skin condition assessment factor, when the deteriorated skin condition assessment factor confirmed by the second comparison result corresponds to the deteriorated skin condition assessment factor confirmed by the first comparison result, and corresponds to the deteriorated skin condition assessment factor confirmed by the third comparison result, and when the improved skin condition assessment factor confirmed by the second comparison result corresponds to the changeless skin condition assessment factor from the first comparison result, or corresponds to the deteriorated skin condition assessment factor and corresponds to the deteriorated skin condition assessment factor of the third comparison result.

Furthermore, the non-face-to-face consulting server (200) may determine, as being negligent in management to a relevant skin condition assessment factor, when the deteriorated skin condition assessment factor confirmed by the second comparison result corresponds to the deteriorated skin condition assessment factor confirmed by the first comparison result, and corresponds to the deteriorated skin condition assessment factor confirmed by the third comparison result, and when the improved skin condition assessment factor confirmed by the second comparison result corresponds to the changeless skin condition assessment factor from the first comparison result, or corresponds to the deteriorated skin condition assessment factor and corresponds to the deteriorated skin condition assessment factor of the third comparison result.

At this time, the non-face-to-face consulting server (200) may report the relevant determination results to the skin care App to allow the relevant user to confirm or check thereto.

Although the invention has been described based upon these preferred embodiments, it would be apparent to, and readily appreciated by, those of ordinary skill in the art that certain modifications, variations, and alternative constructions would be apparent, while remaining within the spirit and scope of the invention.

What is claimed is:

1. A non-face-to-face consulting system for skin care and cosmetics use, the system comprising:
   a non-face-to-face consulting server providing a user with consultations on skin care method and recommended cosmetics based on skin conditions of an analyzed user by analyzing the skin conditions of the user when the skin condition information of the user is received; and
   a skin care application (App) disposed on a user terminal and transmitting the skin care information including a skin photograph of the user and a skin condition reply of the user to the non-face-to-face consulting server, wherein the non-face-to-face consulting server analyzes the skin condition of the user when receiving the skin condition information of the user from the skin care App disposed on the user terminal, and sorts out (selects) a skin condition assessment factor based on the skin condition analysis result of the user, wherein the skin condition assessment factor includes an entire skin tone, shapes and number of pimples, inflammatory skin symptoms, the number and sizes of pores, sebum secretion, skin glows, skin wrinkles, and direction and size of skin wrinkles, wherein the skin care App transmits, to the non-face-to-face consulting server, the skin photograph captured by the user together with a photograph-shooting condition data set, the photograph-shooting condition data set is a data set on illumination data of relevant shooting space at an acquisition time of relevant skin photograph, brightness data at a relevant shooting means and color temperature data, the non-face-to-face consulting server performs an image preprocess for matching all skin photograph shooting conditions by adjusting the illumination data, brightness data and color temperature data within the shooting condition data set regarding relevant skin photograph using a pre-set standard illumination data, standard brightness data, and standard color temperature data whenever the skin photograph of the user is received from the skin care App, the non-face-to-face consulting server obtains an environmental influence data including temperature data, humidity data and UV strength data with reference to the shooting period of relevant skin photograph, the said image preprocessed skin photograph together with the environmental influence data is stored in the database, and the non-face-to-face consulting server performs the calculation of skin condition change of user based on the said image preprocessed skin photograph and the environmental influence data, and wherein the non-face-to-face consulting server builds up, using a prior-set neural network model, a correlation model assessable of an influence on changes in colors and shapes of each skin condition assessment factor image-identified by the temperature data and humidity data and the UV strength data within the skin photograph as the environmental influence data through neural network learning of skin photograph samples of multiple users, selects the most recent prior skin photograph of the user having a shooting time difference more than the prior-set comparison period from the current skin photograph of the user among the skin photographs of the user stored in the databas, obtains, from outside information servers, a daily temperature data, daily humidity data and daily UV strength data as the environmental influence data corresponding to a section between a shooting period of prior skin photograph of selected user and a shooting period of current skin photograph of the user, generates first skin condition analysis information that has extracted colors and shapes of each skin condition assessment factor identified within a relevant image in a state where the current skin photograph is set as a standard image, generates second skin condition analysis information that has extracted colors and shapes of each skin condition assessment factor identified within a relevant image in a state where the prior skin photograph is set as a standard image, and generates third skin condition analysis information that has extracted changes in colors and shapes of each skin condition assessment factor when the environmental influence data during the said periods is applied by sequentially inputting each of the temperature data, humidity data and UV strength data corresponding to the said periods using parameter values of the correlation model in a state where the prior skin photograph is set as a standard image.

2. The system of claim 1, wherein the non-face-to-face consulting server confirms a skin condition assessment factor improved at a current point, a deteriorated skin condition assessment factor and a changeless skin condition assessment factor when compared with those of the previous ones, by calculating, as a first comparison, a difference between the colors and shapes of skin condition assessment factor included in the first skin condition analysis information and the colors and shapes of skin condition assessment factor included in the second skin condition analysis information, confirms an improved skin condition assessment factor, a deteriorated skin condition assessment factor and a changeless skin condition assessment factor when the environmental influence is reflected, by calculating, as a second comparison, a difference between changed colors and shapes of skin condition assessment factor included in the third skin condition analysis information and changes in colors and shapes of skin condition assessment factor included in the second skin condition analysis information, confirms an improved skin condition assessment factor, a deteriorated skin condition assessment factor and a changeless skin condition assessment factor by calculating, as a third comparison, a difference between the colors and shapes of skin condition assessment factor included in the first skin condition analysis information and changed colors and shapes of skin condition assessment factor included in the third skin condition analysis information.

3. The system of claim 2, wherein the non-face-to-face consulting server stores, in the database, the cosmetics information used by the user, and cosmetics information used in the skin condition improvement for each skin condition assessment factor, determines, as being proper, the cosmetics related to the improvement of relevant skin condition assessment factor among the cosmetics used by a relevant user when the changeless skin condition assessment factor confirmed by the second comparison result corresponds to the skin condition assessment factor improved in the first comparison result, when the deteriorated skin condition assessment factor confirmed as the second comparison result corresponds to the changeless skin condition assessment factor in the first comparison result, or to the improved skin condition assessment factor, or corresponds to the improved skin condition assessment factor confirmed as the third comparison result, determines, as being ineffective, the cosmetics related to the improvement of relevant skin condition assessment factor among cosmetics used by the relevant user, when the deteriorated skin condition assessment factor confirmed by the second comparison result corresponds to the deteriorated skin condition assessment factor confirmed by the first comparison result but corresponds to the changeless skin condition assessment factor confirmed by the third comparison result, determines, as being negligent in management to a relevant skin condition assessment factor, when the deteriorated skin condition assessment factor confirmed by the second comparison result corresponds to the deteriorated skin condition assessment factor confirmed by the first comparison result, and corresponds to the deteriorated skin condition assessment factor confirmed by the third comparison result, and when the improved skin condition assessment factor confirmed by the second comparison result corresponds to the changeless skin condition assessment factor from the first comparison result, or corresponds to the deteriorated skin condition assessment factor and corresponds to the deteriorated skin condition assessment factor of the third comparison result, and reports the relevant determination results to the skin care App to allow the relevant user to confirm or check thereto.

\* \* \* \* \*